S. C. HAUBERG.
CENTRIFUGAL MILK SEPARATING MACHINE.
APPLICATION FILED MAY 8, 1913.

1,081,304. Patented Dec. 16, 1913.

Witnesses:
Anna Hoyer.
E. Meyer.

Inventor:
Sophus Christopher Hauberg
by Alfred Clause
att.

UNITED STATES PATENT OFFICE.

SOPHUS CHRISTOPHER HAUBERG, OF COPENHAGEN, DENMARK.

CENTRIFUGAL MILK-SEPARATING MACHINE.

1,081,304. Specification of Letters Patent. Patented Dec. 16, 1913.

Application filed May 8, 1913. Serial No. 766,398.

*To all whom it may concern:*

Be it known that I, SOPHUS CHRISTOPHER HAUBERG, director, citizen of the Kingdom of Denmark, residing at Copenhagen, Denmark, have invented certain new and useful Improvements in Centrifugal Milk-Separating Machines, of which the following is a specification.

This invention relates to an improved centrifugal milk separating machine, and more particularly to the drums of such machines.

In order to regulate the ratio between cream and skimmed milk in centrifugal milk separating machines screws have hitherto been employed as a rule which either act as milk regulating screws by influencing the distance separating the layer of the skimmed milk from the center of the drum or which act as cream regulating screws by influencing the pressure under which the cream issues from the drum. Such regulating screws, however, possess various disadvantages. For instance, they have a tendency to become fixed if they are not daily removed, unscrewed or loosened, that is in other words, if they are not frequently cleaned, and when unscrewed too often they are apt to become too loose.

The invention has for its object to provide means on the drums of centrifugal milk separating machines for the purpose of varying the percentage of cream, whereby the employment of regulating screws and thus the disadvantages peculiar to the same are obviated.

The principle on which this invention is based consists in that by restricting the outlet for the skimmed milk, the pressure or head under the action of which the skimmed milk is forced out of the drum is increased, or in other words, the difference between the distance separating the layer of skimmed milk from the center of the drum and the distance separating the layer of cream from the center of said drum is increased, for in consequence of the thus increased pressure or head, also the pressure with which the cream itself issues and consequently the quantity of cream and the percentage of the same will be increased.

One form of the invention is illustrated by way of example in the accompanying drawing, in which:—

Figure 1:
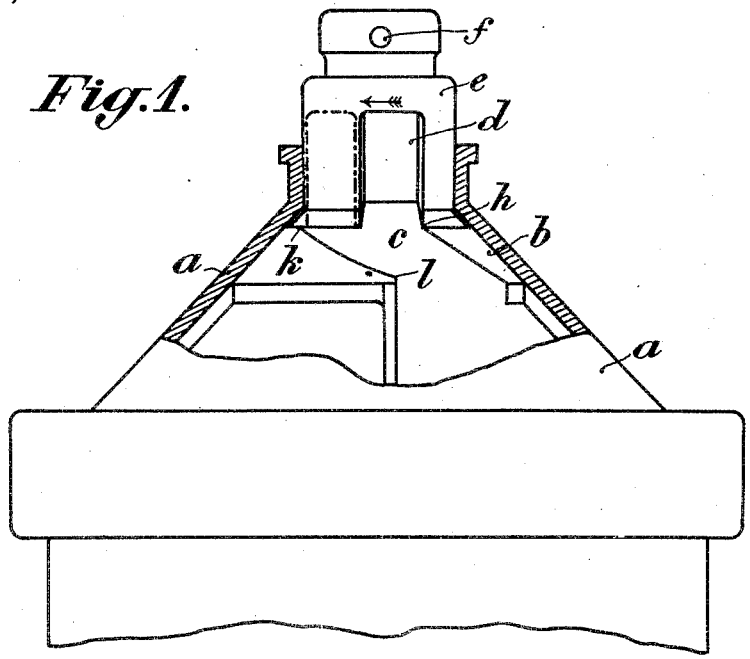
Figure 2:
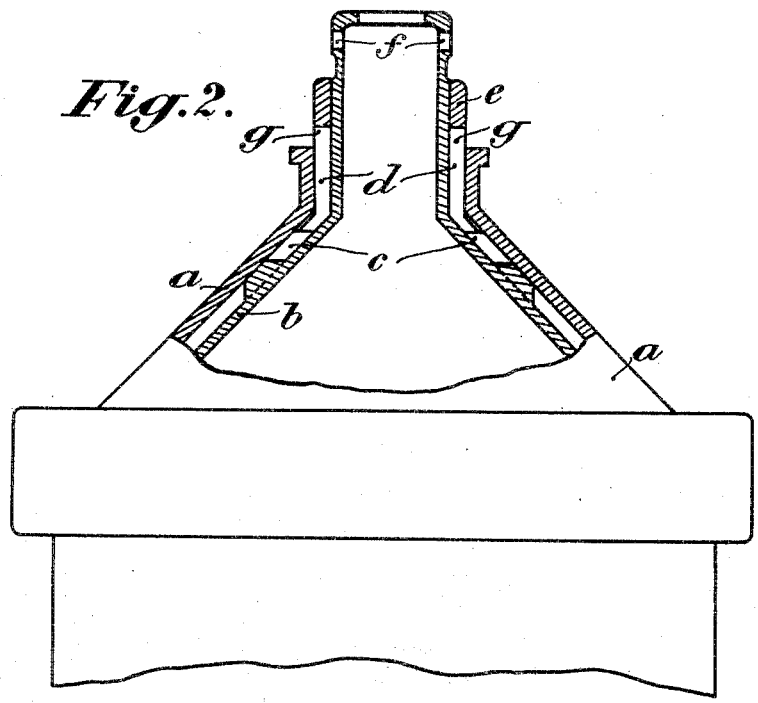

Figure 1 is an elevation of a drum of a centrifugal milk separating machine partly in section, and Fig. 2 is a similar view in which a vertical section is taken through the uppermost portion of said drum.

As shown in the drawing $a$ indicates the centrifugal drum and $b$ the cream removing plate beneath which the cream moves in an inward direction toward the center of the drum, while the skimmed milk moves in an outward direction toward the periphery of the drum, whereas above the cream removing plate the skimmed milk moves in an inward direction toward the center of the drum in order to pass into and through curved ducts $c$ provided on the cream removing plate respectively in a reinforcement on said plate and to penetrate farther in an upward direction between the neck of the cream removing plate and the neck of the centrifugal drum. At this point a revoluble ring $e$ is inserted which is provided at its lower end with oblong recesses or apertures $d$, and is seated upon the top part of the reinforcement on the cream removing plate. Generally two such apertures $d$ which are diametrically arranged in relation to each other, are provided. The recesses or apertures $d$ so co-act with the ducts that by turning the ring $e$ it is possible to vary the cross sectional area of the passage way and the quantity of the outflow of the skimmed milk through the ducts $c$ and apertures $d$. The ring $e$ possesses on account of the apertures $d$ a certain flexibility, to the effect that it is pressed against the centrifugal drum under the influence of the centrifugal force and thus held fast. The position of the ring shown in Fig. 1, allows the maximum quantity of skimmed milk to pass through the ducts $c$ and the aperture $d$. By turning the ring $e$ in the direction of the arrow shown in Fig. 1, in such a way that the aperture $d$ assumes the position shown in dotted lines the passage to $d$ is restricted by the corner $h$ of the ring $e$, and the side $k$ $l$ of the duct $c$ the cross sectional area for the outflow thus being decreased. The more the edge $h$ of the ring $e$ approaches the side $k$ $l$ of the duct $c$, the smaller will be the cross sectional passage area of this duct $c$, as shown in Fig. 1. With a definite supply of fresh milk, such a turning movement of the ring $e$ will force the layer of cream in an inward direction toward the center of the drum in such a way that the pressure or head is increased, which is necessary in order to force the quantity of skimmed milk out of the duct *c* through the decreased outflow opening. By this means therefore the amount of cream issuing from the centrifugal drum is increased. The cream issues through the holes *f* provided in the neck of the cream removing plate *b*, while the skimmed milk leaves the centrifugal drum through the openings *g*. In order to regulate the issue of the cream from the centrifugal drum it is only necessary to turn the ring, when the machine has been stopped, which is easily done, without it being necessary to take the machine apart or to loosen any screws or the like.

I claim:

In a centrifugal milk separating machine means provided on the centrifugal drum which serve for regulating the ratio between the quantity of skimmed milk and cream by restricting or enlarging the outflow ducts for the skimmed milk said means comprising a revoluble ring (*e*) arranged between the neck of the drum and the neck of the cream removing plate and provided with, preferably two, apertures *d* for the passage of the skimmed milk, which apertures so co-act with curved ducts (*c*) provided on the cream removing plate, that by turning the ring the cross sectional passage area in the ducts (*c*) for the skimmed milk may be varied.

In testimony whereof I have affixed my signature in presence of two witnesses.

SOPHUS CHRISTOPHER HAUBERG.

Witnesses:
 H. BONTARD,
 AXEL PERMIN.

---

Copies of this patent may be obtained for five cents each, by addressing the "Commissioner of Patents, Washington, D. C."